US010925091B2

(12) United States Patent
Zhang et al.

(10) Patent No.: US 10,925,091 B2
(45) Date of Patent: Feb. 16, 2021

(54) LISTEN-BEFORE-TALK (LBT) WITH NEW RADIO-SPECTRUM SHARING (NR-SS) DISCOVERY SIGNAL TRANSMISSION

(71) Applicant: QUALCOMM Incorporated, San Diego, CA (US)

(72) Inventors: Xiaoxia Zhang, San Diego, CA (US); Aleksandar Damnjanovic, Del Mar, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/056,128

(22) Filed: Aug. 6, 2018

(65) Prior Publication Data

US 2019/0059106 A1 Feb. 21, 2019

Related U.S. Application Data

(60) Provisional application No. 62/546,426, filed on Aug. 16, 2017.

(51) Int. Cl.
*H04L 12/28* (2006.01)
*H04W 74/08* (2009.01)
(Continued)

(52) U.S. Cl.
CPC ...... *H04W 74/0816* (2013.01); *H04B 7/0695* (2013.01); *H04L 5/0048* (2013.01);
(Continued)

(58) Field of Classification Search
None
See application file for complete search history.

(56) References Cited

U.S. PATENT DOCUMENTS 10,257,860 B2 * 4/2019 Si ............... H04W 74/0816
2016/0127098 A1 5/2016 Ng et al.
(Continued)

FOREIGN PATENT DOCUMENTS

CN 106658751 A 5/2017
WO WO-2017026980 A1 2/2017
(Continued)

OTHER PUBLICATIONS

U.S. Appl. No. 62/411,198; Si, "Channel Access Framework for Multi-beam Operation on the Unlicensed Spectrum", Oct. 21, 2016 (Year: 2016).*
(Continued)

*Primary Examiner* — Kwang B Yao
*Assistant Examiner* — Juvena W Loo
(74) *Attorney, Agent, or Firm* — Haynes and Boone, LLP

(57) ABSTRACT

Wireless communications systems and methods related to performing listen-before-talk (LBT) with discovery signal transmissions for spectrum sharing are provided. A wireless communication device senses a channel in a spatial domain based on a plurality of expected beam transmission directions, wherein the wireless communication device is associated with a first network operating entity, and wherein the channel is shared by a plurality of network operating entities including the first network operating entity. The wireless communication device transmits a plurality of discovery signals in one or more of the plurality of expected beam transmission directions during a discovery period to facilitate synchronization in the channel based on the sensing.

28 Claims, 11 Drawing Sheets

(51) Int. Cl.
*H04W 56/00* (2009.01)
*H04B 7/06* (2006.01)
*H04L 5/00* (2006.01)
*H04W 16/14* (2009.01)
*H04W 48/16* (2009.01)
*H04W 72/04* (2009.01)
*H04W 16/28* (2009.01)
*H04B 7/0408* (2017.01)

(52) U.S. Cl.
CPC .......... *H04W 16/14* (2013.01); *H04W 48/16* (2013.01); *H04W 56/001* (2013.01); *H04W 56/0085* (2013.01); *H04W 72/0446* (2013.01); *H04B 7/0408* (2013.01); *H04W 16/28* (2013.01)

(56) References Cited

U.S. PATENT DOCUMENTS

| | | | | |
|---|---|---|---|---|
| 2016/0381596 A1* | 12/2016 | Hu | ............. | H04B 7/18504 370/236 |
| 2017/0013482 A1* | 1/2017 | Tandai | ............. | H04L 5/0048 |
| 2017/0118773 A1* | 4/2017 | Cariou | ............. | H04B 7/0413 |
| 2018/0220420 A1* | 8/2018 | Harada | ............. | H04W 72/0446 |
| 2018/0220459 A1* | 8/2018 | Park | ............. | H04W 72/1273 |
| 2019/0075596 A1* | 3/2019 | Ye | ............. | H04W 74/0816 |
| 2019/0230706 A1* | 7/2019 | Li | ............. | H04B 7/0695 |
| 2019/0268938 A1 | 8/2019 | Zhao et al. | | |
| 2019/0268939 A1* | 8/2019 | Yang | ............. | H04W 76/11 |
| 2019/0373635 A1* | 12/2019 | Yang | ............. | H04B 7/0408 |
| 2019/0380038 A1* | 12/2019 | Bang | ............. | H04W 16/28 |
| 2019/0387412 A1 | 12/2019 | Kim et al. | | |
| 2020/0084804 A1 | 3/2020 | Zhang et al. | | |

FOREIGN PATENT DOCUMENTS

WO  WO-2017096121 A1  6/2017
WO  WO-2018107951 A1  6/2018

OTHER PUBLICATIONS

International Search Report and Written Opinion—PCT/US2018/045585—ISA/EPO—Oct. 29, 2018.

* cited by examiner

LISTEN-BEFORE-TALK (LBT) WITH NEW RADIO-SPECTRUM SHARING (NR-SS) DISCOVERY SIGNAL TRANSMISSION

CROSS REFERENCE TO RELATED APPLICATIONS

The present application claims priority to and the benefit of the U.S. Provisional Patent Application No. 62/546,426, filed Aug. 16, 2017, which is hereby incorporated by reference in its entirety as if fully set forth below and for all applicable purposes.

TECHNICAL FIELD

This application relates to wireless communication systems and methods, and more particularly to performing listen-before-talk (LBT) prior to discovery signal transmissions in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In a radio access network such as an NR network, a base station may transmit synchronization signals to allow UEs to search and acquire synchronization to a cell within the radio access network. In some instances, a base station may transmit synchronization signals repeatedly at a predetermined periodicity. When the network operates at high frequencies, for example, at about 6 GHz or above 6 GHz, the path-loss may be high. To overcome the high path-loss, a base station may perform beamforming, which may include analog and/or digital beamforming, to create narrow beams for transmissions to UEs in the network. For example, the base station may transmit synchronization signals in different beam directions using narrow transmission beams. When the network operates in a shared medium or a shared channel, the synchronization signal transmissions may collide with transmissions from other nodes sharing the channel One approach to avoiding collisions is to perform listen-before-talk (LBT) to ensure that the shared channel is clear before transmitting a synchronization signal. Since a base station may sweep through multiple narrow beams for synchronization signal transmissions, LBT procedures considering beam sweeping are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes sensing, by a wireless communication device, a channel in a spatial domain based on a plurality of expected beam transmission directions, wherein the wireless communication device is associated with a first network operating entity, and wherein the channel is shared by a plurality of network operating entities including the first network operating entity; and transmitting, by the wireless communication device, a plurality of discovery signals in one or more of the plurality of expected beam transmission directions during a discovery period to facilitate synchronization in the channel based on the sensing.

In an additional aspect of the disclosure, an apparatus includes a processor configured to sense a channel in a spatial domain based on a plurality of expected beam transmission directions, wherein the apparatus is associated with a first network operating entity, and wherein the channel is shared by a plurality of network operating entities including the first network operating entity; and a transceiver configured to transmit a plurality of discovery signals in one or more of the plurality of expected beam transmission directions during a discovery period to facilitate synchronization in the channel based on the sensing.

In an additional aspect of the disclosure, a computer-readable medium having program code recorded thereon, the program code includes code for causing a wireless communication device to sense a channel in a spatial domain based on a plurality of expected beam transmission directions, wherein the wireless communication device is associated with a first network operating entity, and wherein the channel is shared by a plurality of network operating entities including the first network operating entity; and code for causing the wireless communication device to transmit a plurality of discovery signals in one or more of the plurality of expected beam transmission directions during a discovery period to facilitate synchronization in the channel based on the sensing.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
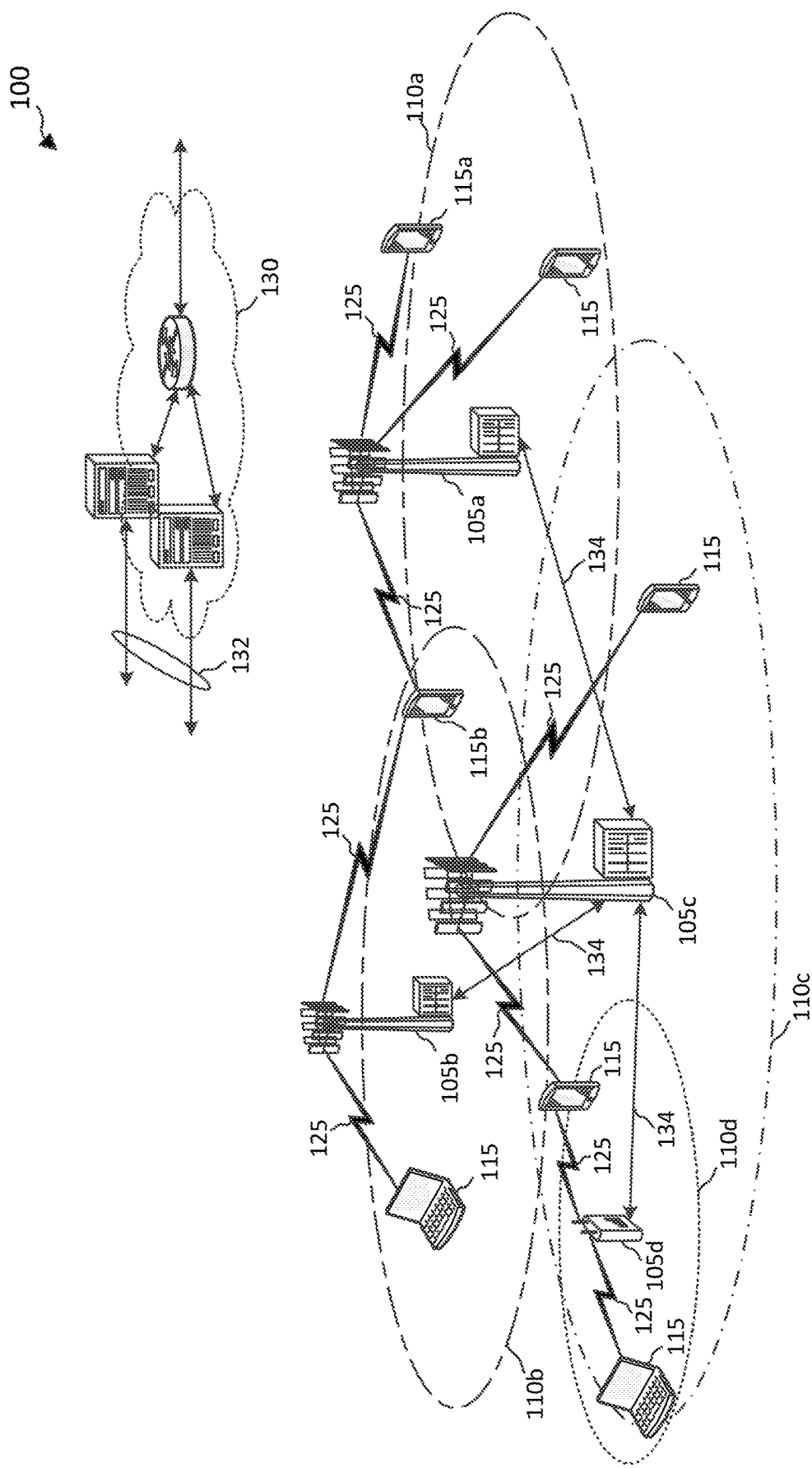
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G) operating in mmWave bands) network.

To facilitate synchronization in a network, a base station (BS) may sweep through multiple narrow beams directing towards different beam directions in a designated time period for transmitting discovery signals. The designated time period may be referred to as a discovery reference signal (DRS) measurement timing configuration (DMTC) period. The DMTC periods may be repeated at a predetermined periodicity. The discovery signals may be referred to as synchronization signal blocks (SSBs). An SSB may include a combination of synchronization signals, broadcast system information signals, and/or discovery reference signals. In some instances, each SSB in a DMTC period may be transmitted in a different beam direction.

The present application describes mechanisms for performing LBT prior to discovery signal transmissions in a frequency spectrum shared by multiple network operating entities. For example, a BS may perform omnidirectional LBT and/or spatial-specific LBTs to determine whether a channel is clear in beam directions where discovery signals are expected to be transmitted in a subsequent time period. When the omnidirectional LBT and/or the spatial-specific LBTs indicate that the channel is idle, the BS may proceed with the discovery signal transmissions. When the omnidirectional LBT and/or the spatial-specific LBTs indicate that the channel is busy, the BS may refrain from proceeding with the discovery signal transmissions.

In an embodiment, the BS may perform omnidirectional LBT prior to a DMTC period. For example, the BS may monitor the channel for a transmission from another node using an omnidirectional reception beam. When the channel is clear, the BS may additionally transmit a channel reservation signal or a preamble signal using an omnidirectional transmission beam to indicate a reservation for the channel in a subsequent DMTC period.

In an embodiment, the BS may perform multiple spatial-specific or directional LBTs, sweeping through a set of narrow directional reception beams, prior to a DMTC period. For example, the BS may monitor the channel in a beam direction covering a group of one or more expected beam transmission directions in a subsequent DMTC period in each directional LBT. When the directional LBT indicates that the channel is clear, the BS may additionally transmit a channel reservation signal in the monitored direction.

In an embodiment, the BS may perform multiple spatial-specific LBTs, sweeping through a set of directional beams, within a DMTC period. For example, the BS may monitor the channel in a beam direction covering a group of one or more expected beam transmission directions in a subsequent sub-period within the DMTC period. When the directional LBT indicates that the channel is clear, the BS may additionally transmit a channel reservation signal in the monitored direction.

In an embodiment, the BS may transmit the discovery signals in a portion of a system frequency band. The BS may transmit a channel reservation signal concurrent with a discovery signal using frequency-division multiplexing (FDM) in the system frequency band. The BS may transmit a data signal on remaining resources in the DMTC period. The BS may transmit the data signal in a beam direction based on monitored beam directions.

Aspects of the present application can provide several benefits. For example, the omnidirectional LBT and the omnidirectional channel reservation can avoid interference from nearby transmitters with a minimal system overhead. The directional LBTs and the directional channel reservations can avoid interference from transmitters that use directional transmission beams and/or directional reception beams. Thus, the directional LBTs and the directional channel reservations can further improve system performance and reduce collisions. Performing the directional LBTs and the directional channel reservations within a DMTC period can reduce the time gap between a directional LBT and transmissions in corresponding monitored beam directions. The reduction in the time gap can further improve system performance. The use of FDM for transmitting channel reservation signals concurrent with discovery signals can reduce system overhead. The use of unused resources within the DMTC period for data transmissions can improve system resource utilization efficiency. The disclosed embodiments may be suitable for use with any wireless communication protocol in any wireless network for spectrum sharing.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. The BSs 105 and the UEs 115 may be operated by multiple network operating entities sharing resources in the shared channel. A BS 105 or a UE 115 may reserve a transmission opportunity (TXOP) in the shared channel by transmitting a reservation signal prior to transmitting data in the TXOP. Other BSs 105 and/or other UEs 115 may listen to the channel and refrain from accessing the channel during the TXOP upon detection of the reservation signal.

In an embodiment, the shared channel may be located at frequencies of about 6 GHz or above 6 GHz. When a BS 105 operates at a high-frequency range, the BSs 105 may communicate with the UEs 115 using narrow directional beams to overcome the high path-loss in the high-frequency range. For example, the BS 105 may transmit discovery signals, such as PSSs, SSSs, PBCH signals, and/or other discovery reference signals, using narrow directional beams. The BS 105 may sweep the narrow directional beams in multiple directions for the discovery signal transmissions to allow UEs 115 located in different directions with respect to the BS 105 to search and synchronize to the BS 105. In order to avoid collisions with transmissions from other BSs 105 and/or other UEs, the BS 105 may perform LBT in a spatial domain (e.g., spatial-aware LBT) prior to transmitting the discovery signals. Mechanisms for performing LBT with discovery signal transmissions are described in greater detail herein.

Figure 2:
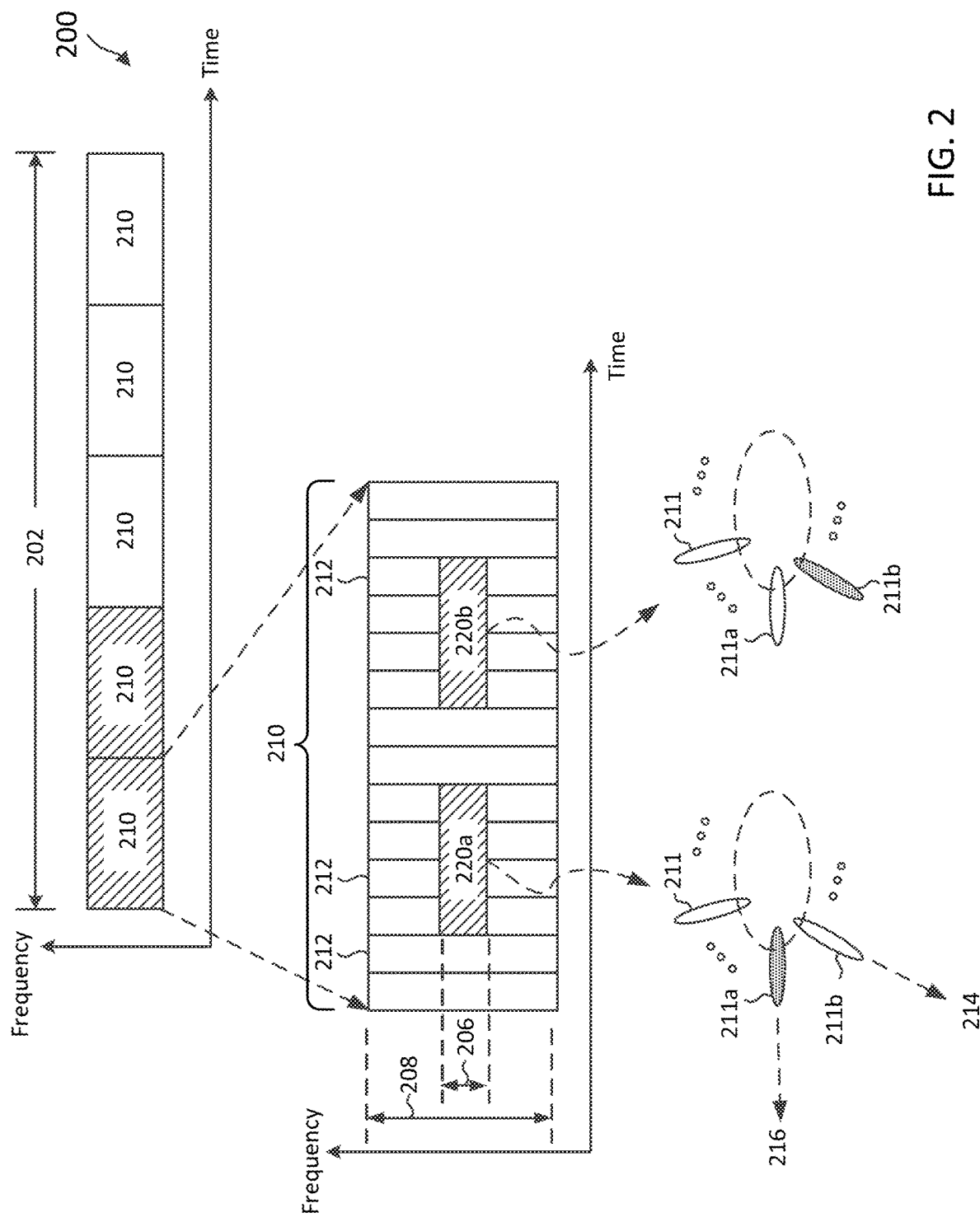
FIG. 2 illustrates a discovery signal transmission scheme according to embodiments of the present disclosure.
Figure 3:
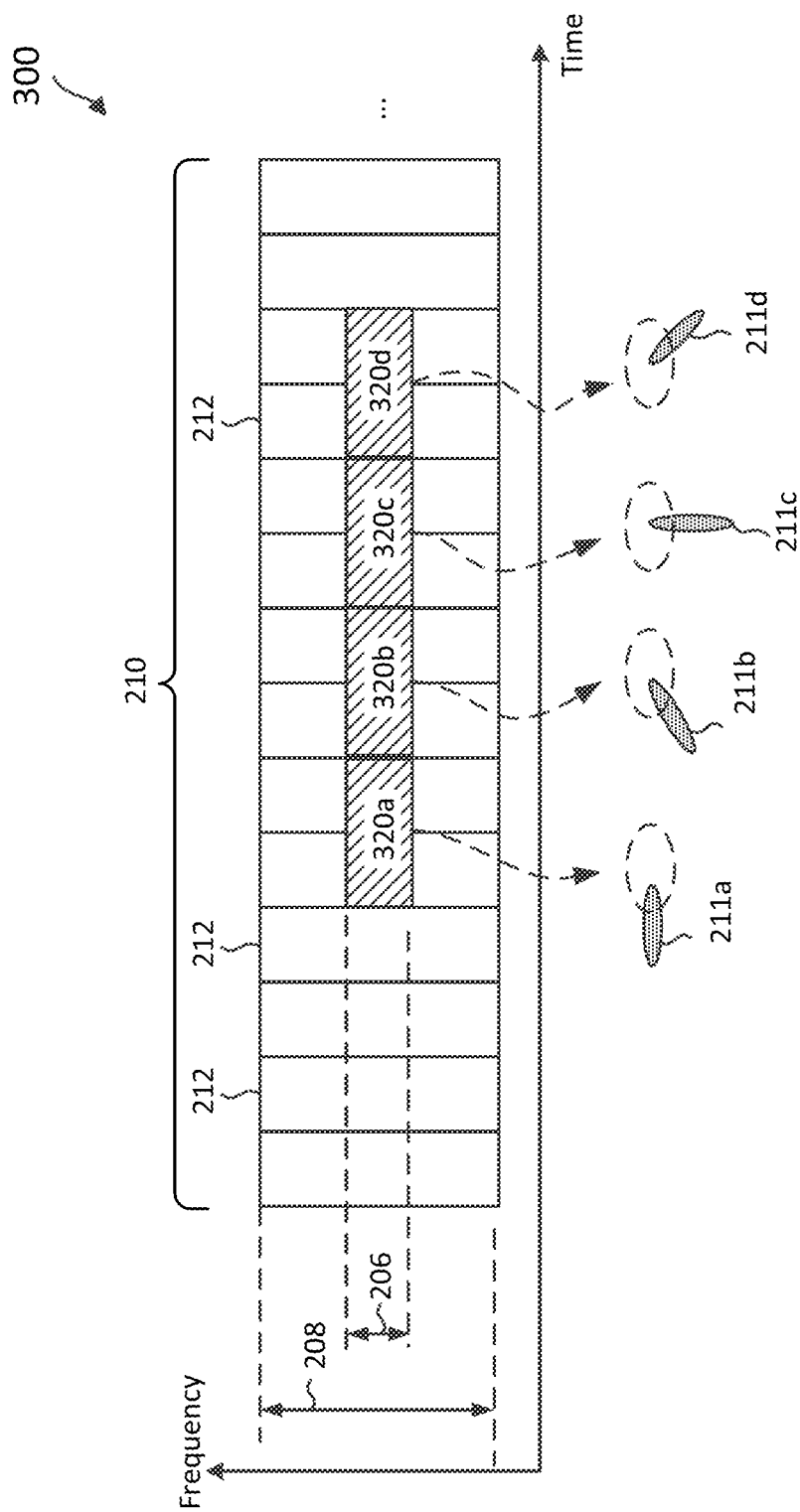
FIG. 3 illustrates a discovery signal transmission scheme according to embodiments of the present disclosure.

FIGS. 2 and 3 illustrate various mechanisms for transmitting discovery signals in units of synchronization signal blocks (SSBs). Each SSB may include a PSS, an SSS, a PBCH signal, and/or any discovery related reference signals. In FIGS. 2 and 3, the x-axes represent time in some constant units, and the y-axes represent frequency in some constant units.

FIG. 2 illustrates a discovery signal transmission scheme 200 according to embodiments of the present disclosure. The scheme 200 may be employed by BSs such as the BSs 105 in a network such as the network 100. The scheme 200 illustrates a plurality of transmission slots 210 in a frequency band 208 over a duration 202. Each transmission slot 210 includes a plurality of symbols 212. The frequency band 208 may be located at frequencies of about sub-6 GHz or above 6 GHz. In some embodiments, the frequency band 208 may be in an unlicensed spectrum or a shared spectrum. A transmission slot 210 may correspond to a subframe or a slot within a subframe. A symbol 212 may correspond to an OFDM symbol. A BS may communicate with a UE such as the UEs 115 in the transmission slots 210. The BS may transmit SSBs 220 in one or more of transmission slots 210 over the duration 202. The SSBs 220 may be transmitted over a frequency band 206. The transmissions are represented by pattern filled boxes. In an embodiment, the frequency band 208 may correspond to a system bandwidth of a network and the frequency band 206 may have a substantially smaller bandwidth than the system bandwidth and may be located within the frequency band 208. The transmissions of the SSBs 220 in the narrower frequency band 206 allow a UE to synchronize to the network by operating in a smaller bandwidth than the system bandwidth, thereby reducing UE implementation complexity.

The duration 202 may be referred to as a DMTC window, which may include any suitable amount of time. As an example, the duration 202 may be about five milliseconds (ms). The number of transmission slots 210 within the duration 202 may vary depending on the subcarrier spacing (SCS) and the number of symbols 212 within a transmission slot 210. In an embodiment, each transmission slot 210 may include about fourteen symbols 212. When the SCS is about 15 kilohertz (kHz), each transmission slot 210 may span about 1 ms and the duration 202 may include about five transmission slots 210. When the SCS is about 30 kHz, each transmission slot 210 may span about 0.5 ms and the duration 202 may include about ten transmission slots 210. When the SCS is about 120 kHz, each transmission slot 210 may span about 0.125 ms and the duration 202 may include about forty transmission slots 210. When the SCS is about 240 kHz, each transmission slot 210 may span about 62.5 microseconds (µs) and the duration 202 may include about eighty transmission slots 210.

In the scheme 200, a BS may transmit L number of SSBs 220 with the duration 202, where L is a positive integer. As an example, each SSB 220 may span about four symbols 212. Thus, each transmission slot 210 may include a maximum of about two SSBs 220. As shown, a SSB 220a may be transmitted in the third, fourth, fifth, sixth symbols 212 of a transmission slot 210 and another SSB 220b may transmitted in the ninth, tenth, eleventh, and twelve symbols 212 of the transmission slot 210. In some other embodiments, the two SSBs 220a and 220b may be transmitted during other symbols 212 within the transmission slot 210. L may have a value of about 4, 8, or 64 depending on the SCS and the duration 202. In an embodiment, L may be about 4 or 8 for a SCS of about 15 kHz or about 30 kHz. When L is 4, a BS may transmit four SSBs 220 in two transmission slots 210 within the duration 202. In some instances, the BS may transmit the SSBs 220 in consecutive transmission slots 210. When L is 8, a BS may transmit eight SSBs 220 in four transmission slots 210 (e.g., consecutively) within the duration 202.

In an embodiment, L may be about 64 for a SCS of about 120 kHz or about 240 kHz. Thus, a BS may transmit sixty-four SSBs 220 in about thirty-two transmission slots 210 within the duration 202. In some instances, the BS may transmit the SSBs 220 in groups of eight SSBs 220 over four transmission slots 210 and the groups may be separated by one transmission slot 210.

In an embodiment, a BS may transmit SSBs 220 in different beam directions over the duration 202. For example, the BS may include an array of antenna elements and may configure the array of antenna elements to form a transmission beam 211 in a certain direction. As an example, the BS may transmit the SSB 220a over a transmission beam 211a (e.g., shown as pattern-filled) directing towards a direction 216 and may transmit the SSB 220b over another transmission beam 211b (e.g., shown as pattern-filled) directing towards a direction 214. In some instances, the duration 202 or the DMTC window may be repeated at a predetermined periodicity (e.g., at about 40 ms, about 80 ms, or about 100 ms), where a BS may periodically transmit the SSBs 220.

FIG. 3 illustrates a discovery signal transmission scheme 300 according to embodiments of the present disclosure. The scheme 300 may be employed by BSs such as the BSs 105 in a network such as the network 100. The scheme 300 may have a substantially similar transmission slot configuration as in the scheme 200. However, the scheme 300 may employ different SCSs for data transmissions and discovery signal or SSB transmissions. As an example, a network may employ an SCS of about 120 kHz for data transmissions and an SCS of about 240 kHz for SSB transmissions. Similar to the scheme 200, a transmission slot 210 may include about fourteen symbols 212. However, a BS may transmit a maximum of about four SSBs 320 similar to the SSBs 220 in a transmission slot 210. Each SSB 320 may span about two symbols 212 instead of four symbols 212 due to the larger SCS used for SSB transmissions. Similar to the scheme 200, each SSB 320 may be transmitted in a different beam direction. As shown, a BS may sweep through multiple narrow directional transmissions beams 211a, 211b, 211c, and 211d during a transmission slot 210 for transmitting the SSBs 320a, 320b, 320c, and 320d, respectively.

Figure 4:
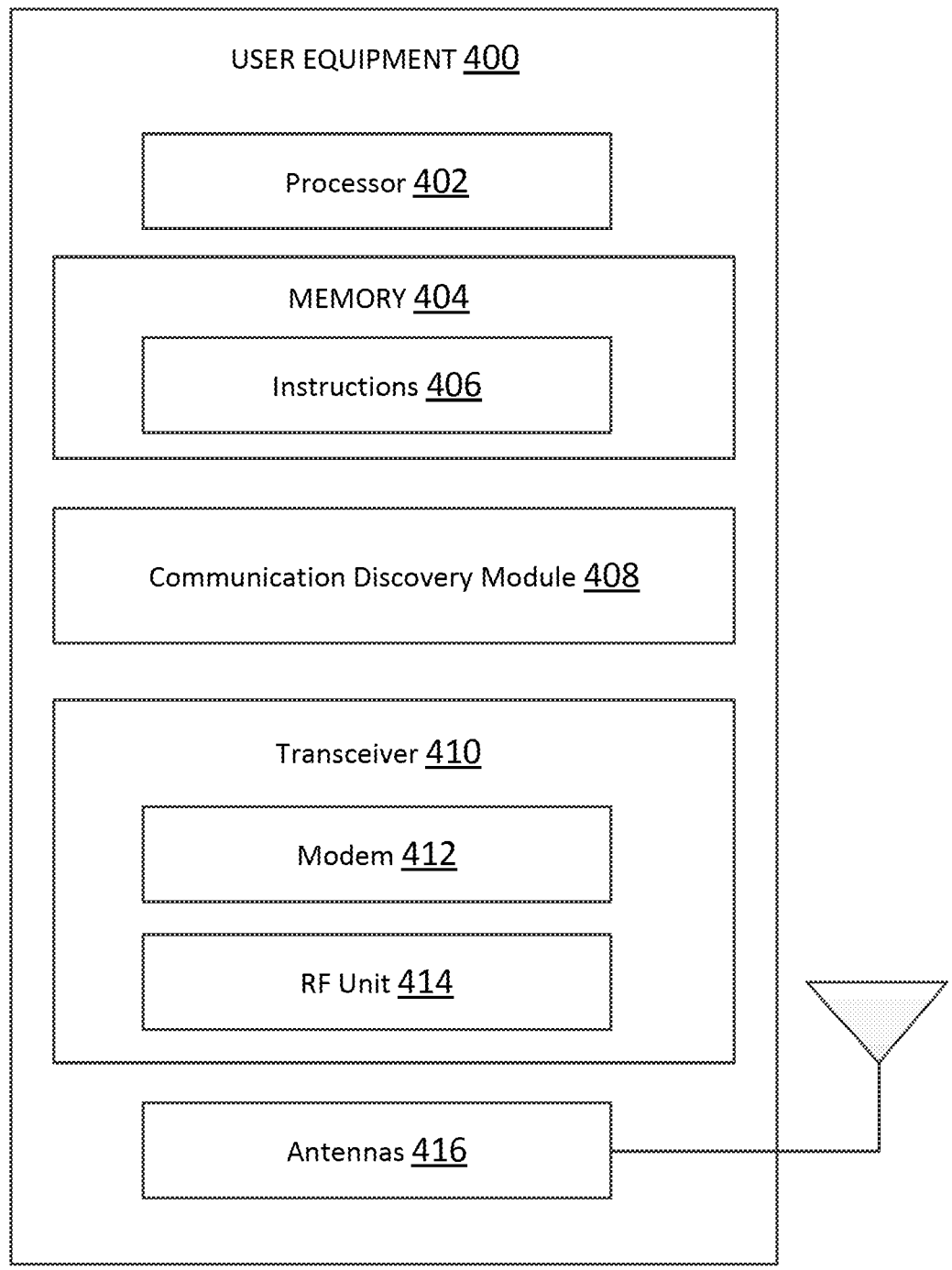
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a communication discovery module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication discovery module 408 may be implemented via hardware, software, or combinations thereof. For example, the communication discovery module 408 may be implemented as a processor, circuit, and/or instructions 406 stored in the memory 404 and executed by the processor 402. The communication discovery module 408 may be used for various aspects of the present disclosure. For example, the communication discovery module 408 is configured to receive discovery signals (e.g., PSS, SSSs, PBCH signals, discovery reference signals, and SSBs 220 and 320) from a BS such as the BSs 105a over a shared channel (e.g., the frequency band 208), synchronize to the BS based on the discovery signals, and/or communicate with the BS after synchronization, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the communication discovery module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of random access signals for initial network attachment and/or data signals carrying information data according to embodiments of the present disclosure. The antennas 416 may further receive data messages transmitted from other devices. This may include, for example, reception of discovery signals such as PSSs, SSSs, PBCH signals, discovery reference signals, and/or SSBs according to embodiments of the present disclosure. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
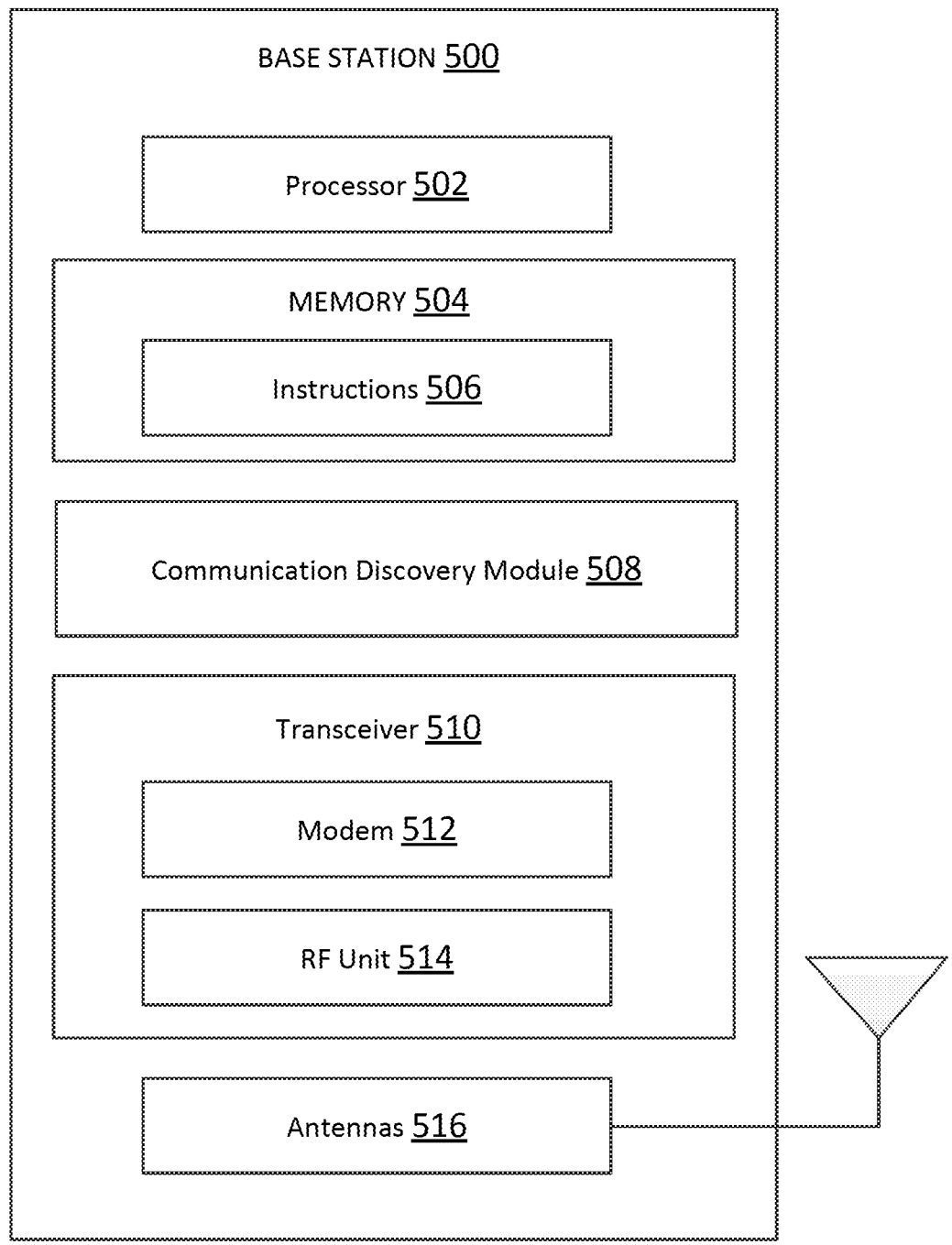
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a communication discovery module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The communication discovery module 508 may be implemented via hardware, software, or combinations thereof. For example, the communication discovery module 508 may be implemented as a processor, circuit, and/or instructions 506 stored in the memory 504 and executed by the processor 502. The communication discovery module 508 may be used for various aspects of the present disclosure. For example, the communication discovery module 508 is configured to perform spatial-aware or directional LBT in a shared channel (e.g., the frequency band 208), transmit discovery signals (e.g., SSBs 220 and 320) based on the results of the LBT, and/or transmit channel reservation signals or preamble signals to silence other nearby transmitters that may interfere with discovery signal transmission, as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming and/or digital beamforming for directional signal transmissions and/or receptions. In some embodiments, the transceiver 510 may include antenna array elements and/or transceiver components (e.g., power amplifiers) that can be switched on or off to form a beam in a particular direction. Alternatively, the transceiver 510 may include multiple transmit/receive chains and may switch between the multiple transmit/receive chains to form a beam in a particular direction. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

FIGS. 6-10 illustrate various mechanisms for performing spatial-aware or directional LBTs in a shared channel prior to transmitting discovery signals (e.g., PSSs, SSSs, PBCH signals, discovery reference signals, and/or SSBs 220 and 320). In FIGS. 6-10, the x-axes represent time in some constant units, and the y-axes represent frequency in some constant units.

Figure 6:
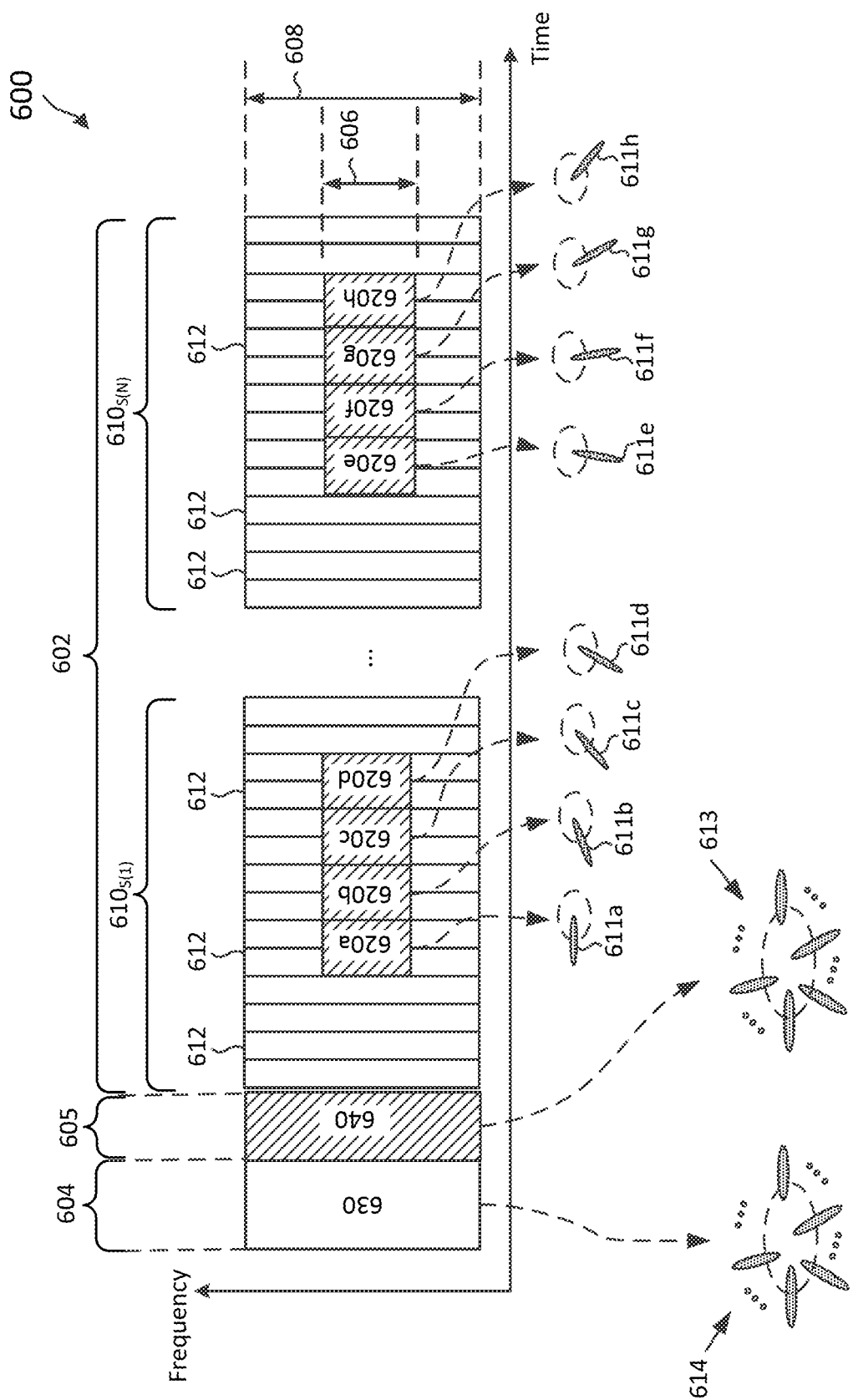
FIG. 6 illustrates a discovery signal transmission scheme with omnidirectional listen-before-talk (LBT) according to embodiments of the present disclosure.

FIG. 6 illustrates a discovery signal transmission scheme 600 with omnidirectional LBT according to embodiments of the present disclosure. The scheme 600 may be employed by BSs such as the BSs 105 and 500 in a network such as the network 100. The scheme 600 includes a DMTC period 602 including a plurality of transmission slots 610 in a frequency band 608 shared by multiple network operating entities. The transmission slots 610 are shown as $610_{S(1)}$ to $610_{S(N)}$. Each transmission slot 610 includes a plurality of symbols 612. The DMTC period 602, the transmission slots 610, the symbols 612, and the frequency band 608 may be substantially similar to the duration 202, the transmission slots 210, the symbols 212, and the frequency band 208, respectively. The DMTC period 602 may be repeated at a sparse frequency rate, for example, at about every 80 ms, every 100 ms, or any suitable rate.

Similar to the schemes 200 and 300, a BS may transmit a plurality of SSBs 620 in a frequency band 606 within the frequency band 608 using multiple directional transmission beams 611 directing towards different beam directions during the DMTC period 602. The frequency band 606 may be substantially similar to the frequency band 206. The direction transmission beams 611 may be substantially similar to the direction transmission beams 211. For example, the BS may transmit a subset of the SSBs 620 in the transmission slot $610_{S(1)}$ and another subset of the SSBs 620 in the transmission slot $610_{S(N)}$. In the transmission slot $610_{S(1)}$, the SSBs 620a, 620b, 620c, and 620d may be transmitted over different transmission beams 611a, 611b, 611c, and 611d, respectively, each directing towards a different direction. Similarly, in the transmission slot $610_{S(N)}$, the SSBs 620e, 620f, 620g, and 620h may be transmitted over different transmission beams 611e, 611f, 611g, and 611h, respectively, each directing towards a different direction. The SSBs 620 may be substantially similar to the SSBs 220 and 320. For example, each SSB 620 may include a PSS, a SSS, a PBCH signal, and/or a discovery reference signal, as described in greater detail herein.

To avoid collisions with transmissions from other nodes (e.g., the BSs 105 and the UEs 115) in the frequency band 208, the BS may listen to the channel (e.g., the frequency band 608) prior to transmitting the SSBs 620. For example, the BS may perform omnidirectional LBT 630 in a period 604 prior to the DMTC period 602. The BS may configure antenna array elements (e.g., in the transceiver 510) such that the BS may receive signals in all available directions as shown by the omnidirectional reception beam 614. When the BS detects a transmission from another node (e.g., a BS 105 or a UE 115) in the channel from any direction, the BS may refrain from proceeding with the transmissions of the SSBs 620 during the DMTC period 602. The detection may be based on energy detection and/or sequence (e.g., a predetermined waveform used for channel reservation) detection and/or preamble (e.g., a predetermined waveform transmitted along with a packet) detection. However, when the BS determines that the channel is idle, the BS may continue to transmit the SSBs 620 during the DMTC period 602.

The BS may optionally transmit a channel reservation signal 640 after performing the omnidirectional LBT 630 to avoid interference from nearby transmitters. The BS may transmit the channel reservation signal 640 over an omnidirectional transmission beam in a period 605. The period 605 may follow the period 604 without a time gap since the BS is not required to switch a beam direction between the omnidirectional LBT 630 and the omnidirectional transmission of the channel reservation signal 640. The BS may configure the antenna array elements to transmit in all directions, as shown by the omnidirectional transmission beam 613. The channel reservation signal 640 may include a predetermined preamble sequence. When another transmitter detected the channel reservation signal 640, the transmitter may refrain from transmitting in the frequency band 608.

The scheme 600 may avoid interferers that are substantially close to the BS. However, the omnidirectional LBT 630 may not be effective in detecting energy or a preamble transmission from a specific beam direction and the omnidirectional channel reservation may not be heard by a node listening or sensing the channel in a specific beam direction.

Figure 7:
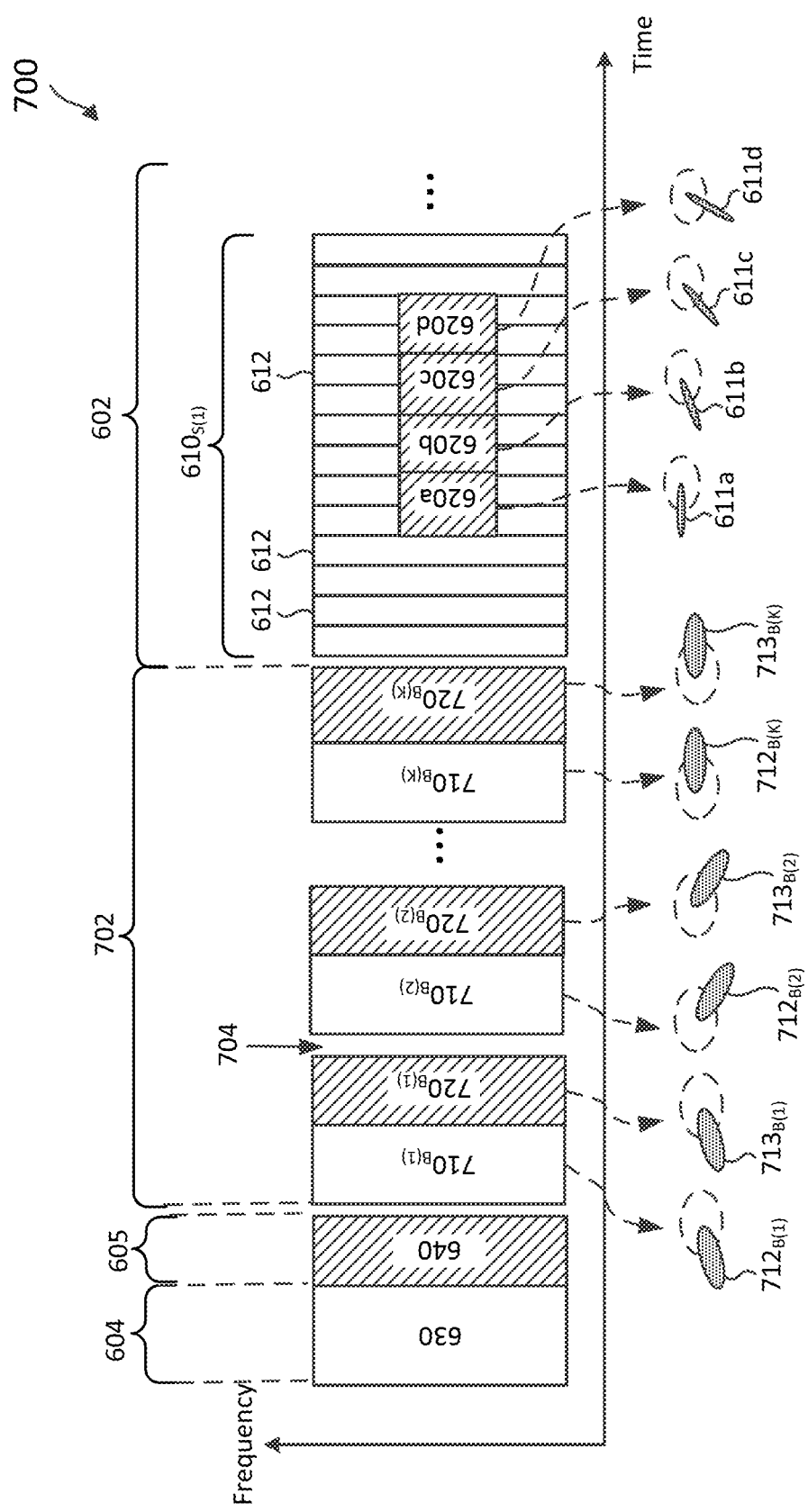
FIG. 7 illustrates a discovery signal transmission scheme with spatial-specific LBT according to embodiments of the present disclosure.

FIG. 7 illustrates a discovery signal transmission scheme 700 with spatial-specific LBT according to embodiments of the present disclosure. The scheme 700 may be employed by BSs such as the BSs 105 and 500 in a network such as the network 100. The scheme 700 may be substantially similar to the scheme 600. However, the scheme 700 may perform spatial-specific LBT and spatial-specific channel reservation in addition to omnidirectional LBT and omnidirectional channel reservation. As shown, a BS may perform spatial-specific LBT 710 by sweeping through a plurality of directional reception beams 712 in a period 702 prior to the DMTC period 602. For example, the BS may perform K number of spatial-specific LBTs 710 as shown by $710_{B(1)}$ to $710_{B(K)}$. Each reception beam 712 may have a coverage over one or more of the transmission beams 611 used for transmitting the SSBs 620 during the DMTC period 602. In other words, the receive beams 712 may have a wider beam width than the transmission beams 611. As an example, a BS may configure antenna array elements to form a reception beam $712_{B(1)}$ for sensing the channel (e.g., the frequency band) in the beam directions of the transmission beams 611a, 611b, 611c, and 611d.

When a spatial-specific LBT 710 indicates that the channel is clear, the BS may proceed with transmissions of SSBs 620 in the beam directions corresponding to the spatial-specific LBT 710. Conversely, when a spatial-specific LBT 710 indicates that the channel is occupied, the BS may refrain from transmitting SSBs 620 in the beam directions corresponding to the spatial-specific LBT 710.

Similar to the scheme 600, the BS may optionally transmit a channel reservation signal 720 after performing each spatial-specific LBT 710. The channel reservation signal 720 may be substantially similar to the channel reservation signals 640. But, the channel reservation signal 720 may be transmitted using a directional beam 713. As shown, the channel reservation signals 720 are transmitted in the same beam direction as a prior spatial-specific LBT 710.

The spatial-specific LBTs and the spatial-specific channel reservations may be effective in avoiding interferers transmitting and/or listening in specific spatial directions. Thus, the scheme 700 may further reduce collisions compared to the scheme 600. However, the BS may require a time gap 704 for switching from one beam direction to another beam direction between the spatial-specific LBTs 710. The presence of the time gap 704 may lead to a collision from an interferer beginning a transmission within the time gap 704.

Figure 8:
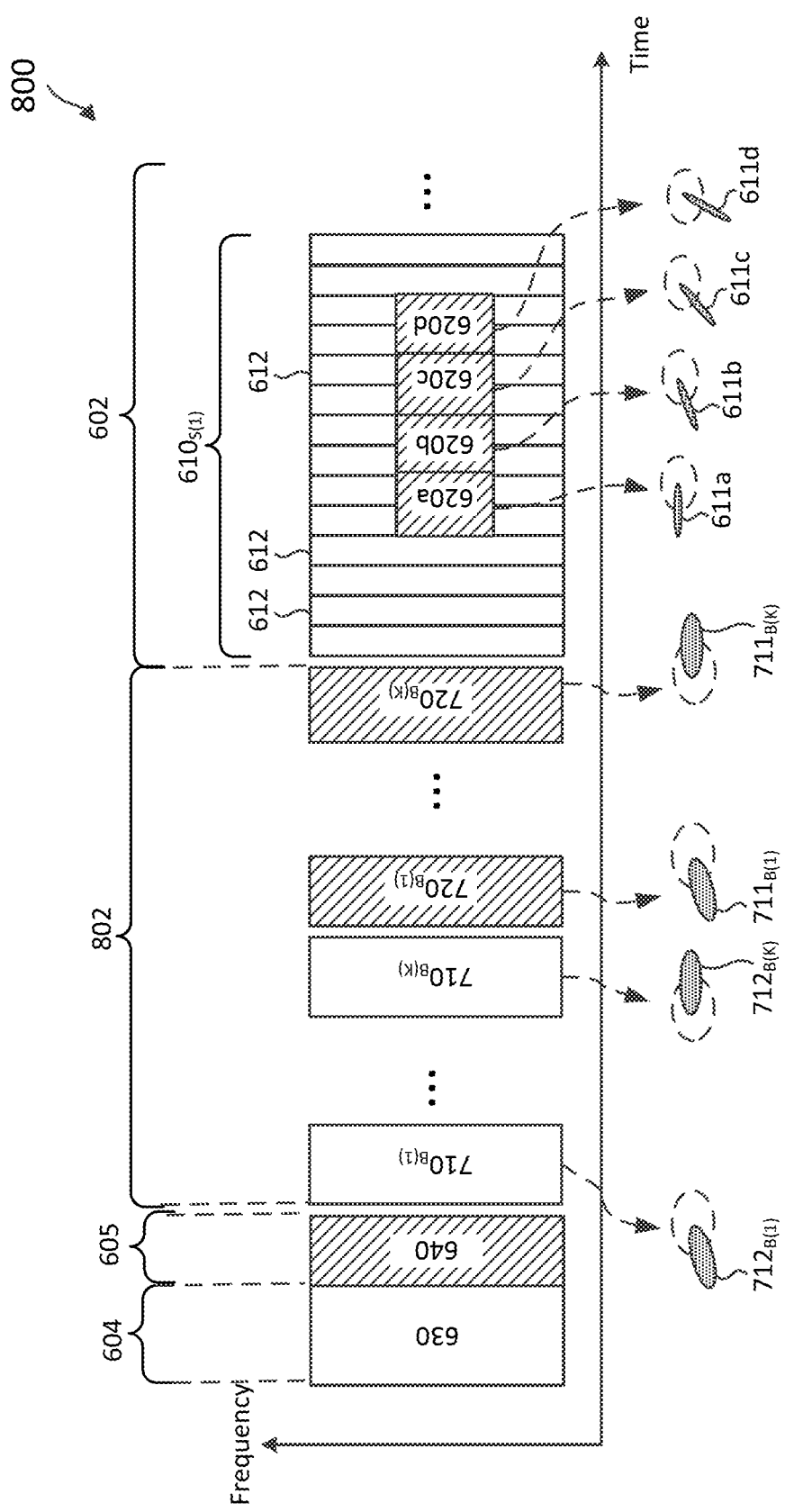
FIG. 8 illustrates a discovery signal transmission scheme with spatial-specific LBT according to embodiments of the present disclosure.

FIG. 8 illustrates a discovery signal transmission scheme 800 with spatial-specific LBT according to embodiments of the present disclosure. The scheme 800 may be employed by BSs such as the BSs 105 and 500 in a network such as the network 100. The scheme 800 may be substantially similar to the scheme 700. However, a BS may sweep spatial-specific LBTs 710 in all K directions prior to transmitting spatial-specific channel reservations signals 720 in response to the spatial-specific LBTs 710. The spatial-specific LBTs 710 and the transmissions of the spatial-specific channel reservations signals 720 may be performed within a period 802 prior to the DMTC period 602. A time gap similar to the time gap 704 may be required between each spatial-specific LBT 710 and each spatial-specific channel reservation signal 720 transmissions to allow the BS to switch antenna array configurations.

Figure 9:
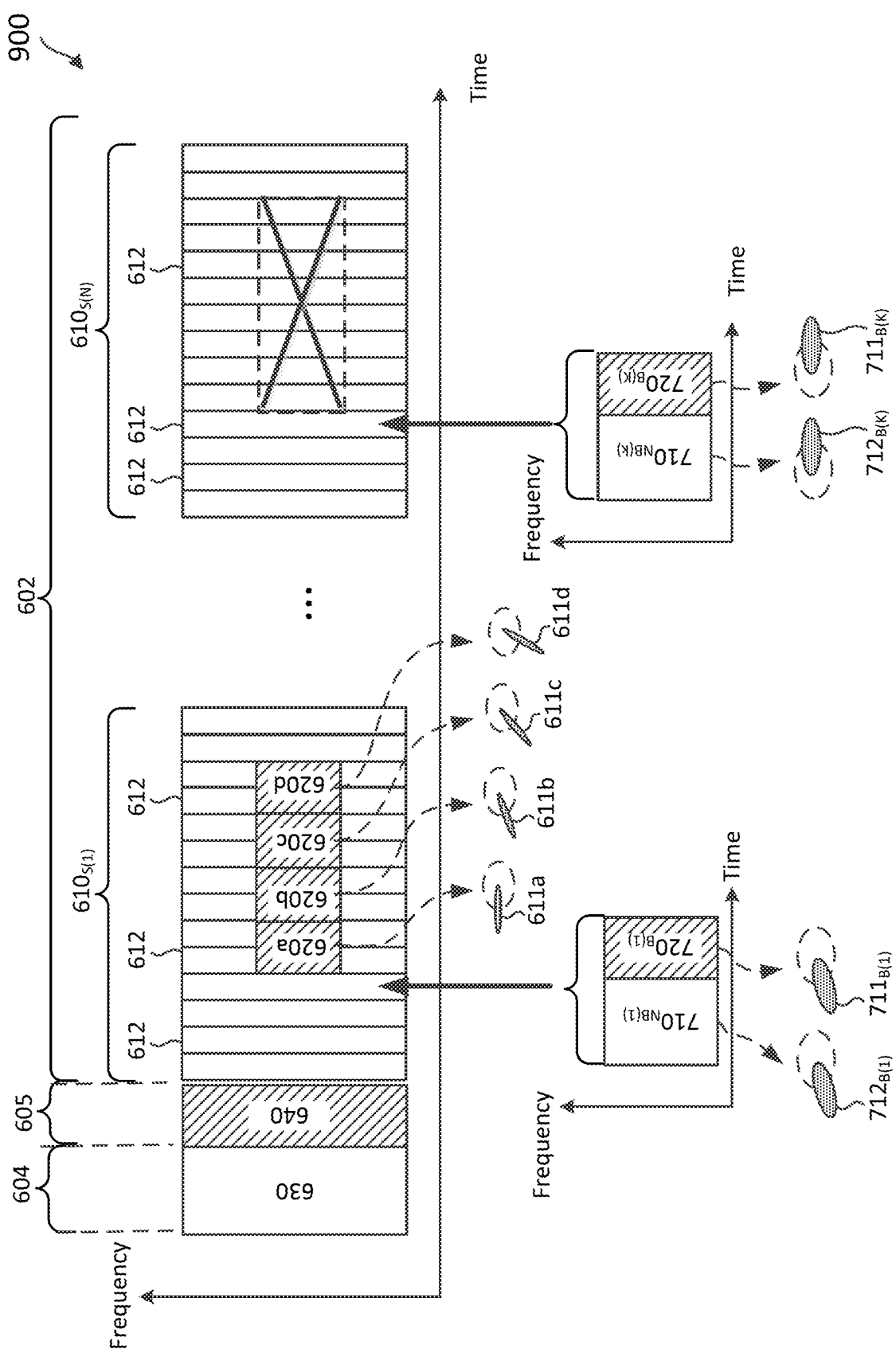
FIG. 9 illustrates a discovery signal transmission scheme with spatial-specific LBT according to embodiments of the present disclosure.

FIG. 9 illustrates a discovery signal transmission scheme 900 with spatial-specific LBT according to embodiments of the present disclosure. The scheme 900 may be employed by BSs such as the BSs 105 and 500 in a network such as the network 100. The scheme 900 may be substantially similar to the schemes 700 and 800. However, in the scheme 900, a BS may perform spatial-specific LBTs 710 and transmit spatial-specific channel reservation signals 720 within a DMTC period 602 instead of prior to a DMTC period 602.

The BS may perform a spatial-specific LBT 710 prior to transmitting a subset of one or more SSBs 620. The spatial-specific LBT 710 may be performed based on the expected beam transmission directions used for transmitting the subset of SSBs 620. As an example, the BS may perform a spatial-specific LBT 710$_{B(1)}$ using a directional reception beam 712$_{B(1)}$ prior to transmitting the SSBs 620a, 620b, 620c, and 620d. The directional reception beam 712$_{B(1)}$ may include a coverage over the transmission beams 611a, 611b, 611c, and 611d. The BS may optionally transmit a channel reservation signal 720 in response to each spatial-specific LBT 710 by using the same beam direction as the spatial-specific LBT 710. The BS may perform the spatial-specific LBT 710 and transmit the spatial-specific channel reservation signal 720 transmission immediately before the transmission of the first SSB 620a in the subset, for example, in a period of one to two symbols 612.

When a spatial-specific LBT 710 (e.g., the spatial-specific LBT 710$_{B(1)}$) indicates that the channel is clear, the BS may proceed with transmitting SSBs 620 (e.g., the SSBs 620a, 620b, 620c, and 620d) in the beam directions corresponding to the spatial-specific LBT 710. Conversely, when a spatial-specific LBT 710 (e.g., the spatial-specific LBT 710$_{B(K)}$) indicates that the channel is occupied, the BS may refrain from transmitting SSBs 620 in the beam directions corresponding to the spatial-specific LBT 710 as shown by the dashed box with the cross.

Comparing the scheme 900 to the schemes 700 and 800, the scheme 900 may further reduce collisions. In addition, the scheme 900 may allow the channel reservation signals 720 to be multiplexed with the SSBs 620, as described in greater detail herein.

While the schemes 700-900 are illustrated with omnidirectional LBT and omnidirectional channel reservation transmissions in conjunctions with spatial-specific LBTs and spatial-specific channel reservations, the omnidirectional LBT and the omnidirectional channel reservation transmissions may be optional.

Figure 10:
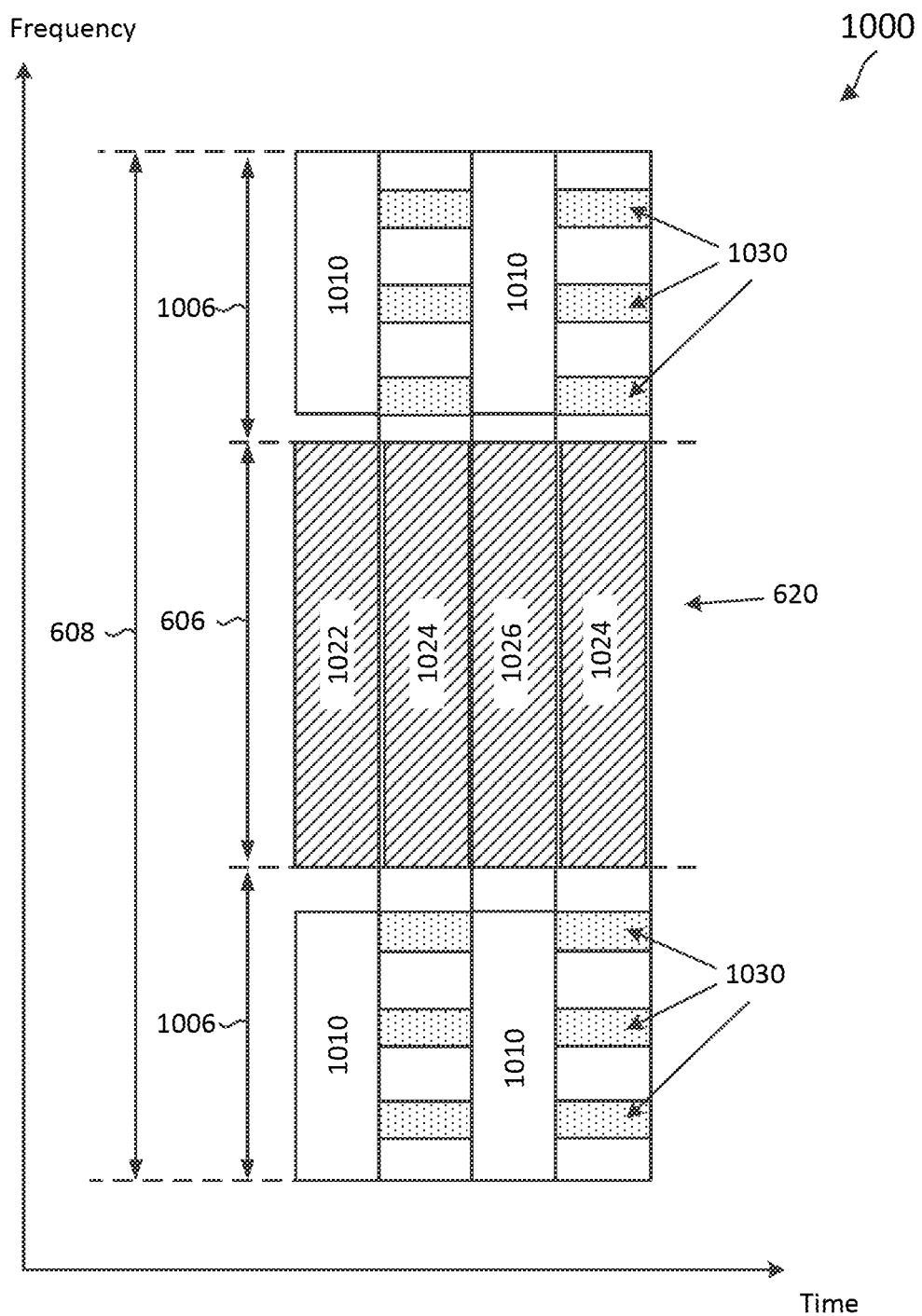
FIG. 10 illustrates a concurrent discovery signal and channel reservation signal transmission scheme according to embodiments of the present disclosure.

FIG. 10 illustrates a discovery signal transmission scheme 1000 with concurrent channel reservation signal transmission according to embodiments of the present disclosure. The scheme 1000 may be employed by BSs such as the BSs 105 and 500 in a network such as the network 100. In particular, the scheme 1000 may be used in conjunction with the scheme 900 to transmit a channel reservation signal 1010 using FDM in place of the channel reservation signal 720 (e.g., using TDM). For example, a BS may transmit an SSB 620 including a PSS 1022, an SSS 1026, and PBCH signals 1024 in the frequency band 606 and may transmit a channel reservation signal 1010 in the same symbol as the PSS 1022 using remaining unused resources (e.g., resource elements (REs)) in the frequency portion 1006. The channel reservation signal 1010 may include a predetermined preamble sequence configured based on the number of unused resource elements in the frequency portion 1006. In addition, the BS may transmit a demodulation reference signal (DMRS) 1030 distributed in the frequency portion 1006 to facilitate decoding of the PBCH signals 1024, channel discovery, and/or channel synchronization. Since the channel reservation signal 1010 is frequency multiplexed with the SSB 620, the scheme 1000 may reduce system overhead compared to the scheme 900.

As shown in the scheme 900 and 1000, there are unused resources (e.g., time-frequency resources) in the DMTC period 602. For example, the first, second, third, fourth, thirteen, and fourteen symbols 612 in the transmission slot 610$_{S(1)}$ are unused. Thus, a BS may transmit a data signal in the unused symbols 612. In an embodiment, the BS may transmit the data signal in a beam direction corresponding to a spatial-specific LBT 710 performed for the subset of SSBs 620 in the transmission slot 610$_{S(1)}$. For example, the BS may use a directional transmission beam similar to the transmission beam 711$_{B(1)}$, which may be wider than the transmission beams 611a, 611b, 611c, and 611d, for the data signal transmission. Alternatively, the BS may select a directional transmission beam from any one of the transmission beams 611a, 611b, 611c, and 611d. The BS may also transmit the data signal in the same symbol 612 as an SSB 620 using remaining unused frequency resources (e.g., in the frequency portion 1006) and in the same beam direction as the SSB 620. Thus, the BS may multiplex data signals with the SSBs 620 in a transmission slot 610 in a time domain and/or frequency domain.

Figure 11:
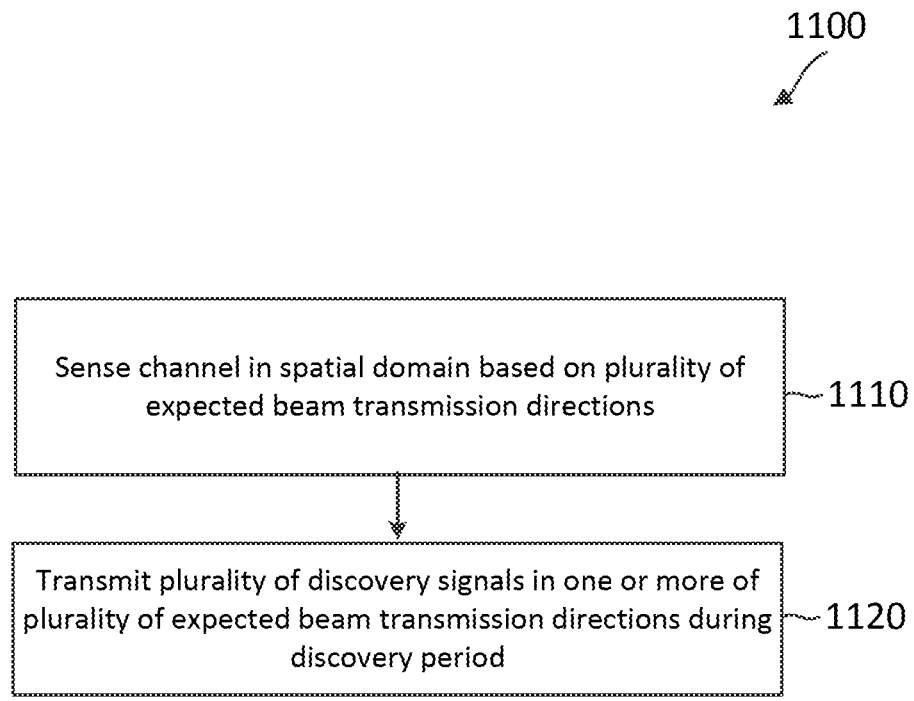
FIG. 11 is a flow diagram of a discovery signal communication method according to embodiments of the present disclosure.

FIG. 11 is a flow diagram of a communication discovery method 1100 according to embodiments of the present disclosure. Steps of the method 1100 can be executed by a computing device (e.g., a processor, processing circuit, and/or other suitable component) of a wireless communication device, such as the BSs 105 and 500. The method 1100 may employ similar mechanisms as in the schemes 200, 300, 600, 700, 800, 900, and 1000 as described with respect to FIGS. 2, 3, 6, 7, 8, 9, and 10, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes sensing, by a wireless communication device, a channel (e.g., the frequency bands 208 and 608) in a spatial domain based on a plurality of expected beam transmission directions (e.g., based on the transmission beams 211 and 611). The wireless communication device may be associated with a first network operating entity. The channel may be shared by a plurality of network operating entity including the first network operating entity.

At step 1120, the method 1100 includes transmitting, by the wireless communication device, a plurality of discovery signals (e.g., the SSBs 220 and 620, the PSS 1022, the SSS 1026, the PBCH signals 1024, and/or any discovery reference signal) in one or more of the plurality of expected beam transmission directions during a discovery period (e.g., the DMTC period 602) to facilitate synchronization in the channel based on the sensing.

In an embodiment, the sensing includes monitoring the channel for a transmission from another wireless communication device using an omnidirectional reception beam (e.g., the omnidirectional reception beam 614) before the discovery period. In response to the sensing, the wireless communication device may transmit a channel reservation signal (e.g., the channel reservation signal 640) over an omnidirectional transmission beam (e.g., the omnidirectional transmission beam 613) before the discovery period.

In an embodiment, the sensing includes sweeping through multiple narrow directional reception beams (e.g., the reception beams 712) and listening to the channel in each of the beam directions. For example, the sensing includes monitoring the channel in a first subset of the plurality of expected beam transmission directions (e.g., the beam directions of the beams 611a, 611b, 611c, and 611d) for a transmission from another wireless communication device. The monitoring includes configuring antenna elements (e.g., in the transceiver 510) of the wireless communication device to direct reception in a beam direction including a coverage over the first subset of the plurality of expected beam transmission directions. In such an embodiment, the transmitting of the plurality of discovery signals may include transmitting a subset of the plurality of discovery signals (e.g., the SSBs 620a, 620b, 620c, and 620d), each in one of the first subset of the plurality of expected beam transmission directions. The sensing can further include monitoring the channel in a second subset of the plurality of expected beam transmission directions (e.g., based on the beams 611e, 611f, 611g, and 611h) for a transmission from another wireless communication device. The sensing can be repeated in subsets of the expected beam transmission directions until all beam directions are monitored.

In some embodiments, the directional sensing (e.g., using the narrow beams) may be performed prior to the discovery period, for example, as shown in the schemes 700 and 800. In response to the sensing, the wireless communication device may transmit a channel reservation signal (e.g., the channel reservation signal 720) after sensing each beam direction before switching to another beam direction. Each channel reservation signal may be transmitted in the same direction as the sensing. Alternatively, the wireless communication device may sweep through all the subset of beam directions for sensing before sweeping through the subset of beam directions for transmitting the channel reservation signals.

In some embodiments, the directional sensing may be performed within the discovery period, for example, as shown in the scheme 900. For example, the channel is monitored in the first subset of the plurality of expected beam transmission directions within the discovery period before transmitting the subset of the plurality of discovery signals. In response to the sensing, the wireless communication device may transmit a channel reservation signal in the same direction as the sensing before transmitting the subset of discovery signals. In some embodiments, the wireless communication device can transmit the channel reservation signal concurrent with at least one of the subset of discovery signals using FDM, for example, as shown in the scheme 1000. In some embodiments, the monitoring in the second subset of the plurality of expected beam transmission directions may detect a transmission from another wireless communication device. Upon the detection, the wireless communication device may refrain from transmitting discovery signals in the second subset of the plurality of expected beam transmission directions.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the present disclosure include a method of wireless communication, comprising sensing, by a wireless communication device, a channel in a spatial domain based on a plurality of expected beam transmission directions, wherein the wireless communication device is associated with a first network operating entity, and wherein the channel is shared by a plurality of network operating entities including the first network operating entity; and transmitting, by the wireless communication device, a plurality of discovery signals in one or more of the plurality of expected beam transmission directions during a discovery period to facilitate synchronization in the channel based on the sensing.

In some embodiments, wherein the sensing includes monitoring the channel for a transmission from another wireless communication device using an omnidirectional reception beam before the discovery period. In some embodiments, the method further comprises transmitting, by the wireless communication device, a channel reservation signal using an omnidirectional transmission beam before the discovery period based on the sensing. In some embodiments, wherein the sensing includes monitoring the channel in a first subset of the plurality of expected beam transmission directions for a transmission from another wireless communication device. In some embodiments, wherein the monitoring includes configuring antenna elements of the wireless communication device to direct reception in a beam direction including a coverage over the first subset of the plurality of expected beam transmission directions. In some embodiments, wherein the transmitting includes transmitting, a subset of the plurality of discovery signals, each in one of the first subset of the plurality of expected beam transmission directions. In some embodiments, wherein the sensing further includes monitoring the channel in a second subset of the plurality of expected beam transmission directions for a transmission from another wireless communication device, wherein the first subset and the second subset of the plurality of expected beam transmission directions are different, and wherein the channel is monitored in the first subset of the plurality of expected beam transmission directions and in the second subset of the plurality of expected beam transmission directions before the discovery period. In some embodiments, the method further comprises transmitting, by the wireless communication device, a first channel reservation signal in the first subset of the plurality of expected beam transmission directions based on the monitoring in the first subset of the plurality of expected beam transmission directions; and transmitting, by the wireless communication device, a second channel reservation signal in the second subset of the plurality of expected beam transmission directions based on the monitoring in the second subset of the plurality of expected beam transmission directions. In some embodiments, wherein the channel is monitored in the first subset of the plurality of expected beam transmission directions within the discovery period before transmitting the subset of the plurality of discovery signals. In some embodiments, the method further comprises transmitting, by the wireless communication device, a channel reservation signal in the first subset of the plurality of expected beam transmission directions before transmitting the subset of the plurality of discovery signals based on the monitoring in first subset of the plurality of expected beam transmission directions. In some embodiments, the method further comprises transmitting, by the wireless communication device, a channel reservation signal concurrent with one of the subset of the plurality of discovery signals based on frequency-division multiplexing (FDM). In some embodiments, wherein the sensing includes monitoring the channel in a second subset of the plurality of expected beam transmission directions within the discovery period; and detecting a transmission from another wireless communication device over the channel in the second subset of the plurality of expected beam transmission directions, and wherein the method further comprises refraining, by the wireless communication device, from transmitting discovery signals in the second subset of the plurality of expected beam transmission directions based on the detecting. In some embodiments, the method further comprises transmitting a data signal by multiplexing the data signal with one or more of the subset of the plurality of discovery signals in at least one of a frequency domain or a time domain. In some embodiments, wherein the data signal is transmitted in at least one of the first subset of the plurality of expected beam transmission directions. In some embodiments, wherein each of the plurality of discovery signals includes at least one of a primary synchronization signal (PSS), a secondary synchronization signal (SSS), a physical broadcast channel (PBCH) signal, or a discovery reference signal.

Further embodiments of the present disclosure include an apparatus comprising a processor configured to sense a channel in a spatial domain based on a plurality of expected beam transmission directions, wherein the apparatus is associated with a first network operating entity, and wherein the channel is shared by a plurality of network operating entities including the first network operating entity; and a transceiver configured to transmit a plurality of discovery signals in one or more of the plurality of expected beam transmission directions during a discovery period to facilitate synchronization in the channel based on the sensing.

In some embodiments, wherein the processor is further configured to sense the channel by monitoring the channel for a transmission from another wireless communication device using an omnidirectional reception beam before the discovery period. In some embodiments, wherein the transceiver is further configured to transmit a channel reservation signal using an omnidirectional transmission beam before the discovery period based on the sensing. In some embodiments, wherein the processor is further configured to sense the channel by monitoring the channel in a first subset of the plurality of expected beam transmission directions for a transmission from another wireless communication device. In some embodiments, wherein the processor is further configured to monitor the channel by configuring antenna elements of the wireless communication device to direct reception in a beam direction including a coverage over the first subset of the plurality of expected beam transmission directions. In some embodiments, wherein the transceiver is further configured to transmit plurality of discovery signals by transmitting a subset of the plurality of discovery signals, each in one of the first subset of the plurality of expected beam transmission directions. In some embodiments, wherein the processor is further configured to sense the channel by monitoring the channel in a second subset of the plurality of expected beam transmission directions for a transmission from another wireless communication device, wherein the first subset and the second subset of the plurality of expected beam transmission directions are different, and wherein the channel is monitored in the first subset of the plurality of expected beam transmission directions and in the second subset of the plurality of expected beam transmission directions before the discovery period. In some embodiments, wherein the transceiver is further configured to transmit a first channel reservation signal in the first subset of the plurality of expected beam transmission directions based on the monitoring in the first subset of the plurality of expected beam transmission directions; and transmit a second channel reservation signal in the second subset of the plurality of expected beam transmission directions based on the monitoring in the second subset of the plurality of expected beam transmission directions. In some embodiments, wherein the channel is monitored in the first subset of the plurality of expected beam transmission directions within the discovery period before transmitting the subset of the plurality of discovery signals. In some embodiments, wherein the transceiver is further configured to transmit a channel reservation signal in the first subset of the plurality of expected beam transmission directions before transmitting the subset of the plurality of discovery signals based on the monitoring in first subset of the plurality of expected beam transmission directions. In some embodiments, wherein the transceiver is further configured to transmit a channel reservation signal concurrent with one of the subset of the plurality of discovery signals based on frequency-division multiplexing (FDM). In some embodiments, wherein the processor is further configured to sense the channel by monitoring the channel in a second subset of the plurality of expected beam transmission directions within the discovery period; and detecting a transmission from another wireless communication device over the channel in the second subset of the plurality of expected beam transmission directions; and refrain from transmitting discovery signals in the second subset of the plurality of expected beam transmission directions based on the detecting. In some embodiments, wherein the transceiver is further configured to transmit a data signal by multiplexing the data signal with one or more of the subset of the plurality of discovery signals in at least one of a frequency domain or a time domain. In some embodiments, wherein the data signal is transmitted in at least one of the first subset of the plurality of expected beam transmission directions. In some embodiments, wherein each of the plurality of discovery signals includes at least one of a primary synchronization signal (PSS), a secondary synchronization signal (SSS), a physical broadcast channel (PBCH) signal, or a discovery reference signal.

Further embodiments of the present disclosure include a computer-readable medium having program code recorded thereon, the program code comprising code for causing a wireless communication device to sense a channel in a spatial domain based on a plurality of expected beam transmission directions, wherein the wireless communication device is associated with a first network operating entity, and wherein the channel is shared by a plurality of network operating entities including the first network operating entity; and code for causing the wireless communication device to transmit a plurality of discovery signals in one or more of the plurality of expected beam transmission directions during a discovery period to facilitate synchronization in the channel based on the sensing.

In some embodiments, wherein the code for causing the wireless communication device to sense the channel is further configured to monitor the channel for a transmission from another wireless communication device using an omnidirectional reception beam before the discovery period. In some embodiments, the computer-readable medium further comprises code for causing the wireless communication device to transmit a channel reservation signal using an omnidirectional transmission beam before the discovery period based on the sensing. In some embodiments, wherein the code for causing the wireless communication device to sense the channel is further configured to monitor the channel in a first subset of the plurality of expected beam transmission directions for a transmission from another wireless communication device. In some embodiments, wherein the code for causing the wireless communication device to monitor the channel is further configured to configure antenna elements of the wireless communication device to direct reception in a beam direction including a coverage over the first subset of the plurality of expected beam transmission directions. In some embodiments, wherein the code for causing the wireless communication device to transmit the plurality of discovery signals is further configured to transmit, a subset of the plurality of discovery signals, each in one of the first subset of the plurality of expected beam transmission directions. In some embodiments, wherein the code for causing the wireless communication device to sense the channel is further configured to monitor the channel in a second subset of the plurality of expected beam transmission directions for a transmission from another wireless communication device, wherein the first subset and the second subset of the plurality of expected beam transmission directions are different, and wherein the channel is monitored in the first subset of the plurality of expected beam transmission directions and in the second subset of the plurality of expected beam transmission directions before the discovery period. In some embodiments, the computer-readable medium further comprises code for causing the wireless communication device to transmit a first channel reservation signal in the first subset of the plurality of expected beam transmission directions based on the monitoring in the first subset of the plurality of expected beam transmission directions; and code for causing the wireless communication device to transmit a second channel reservation signal in the second subset of the plurality of expected beam transmission directions based on the monitoring in the second subset of the plurality of expected beam transmission directions. In some embodiments, wherein the channel is monitored in the first subset of the plurality of expected beam transmission directions within the discovery period before transmitting the subset of the plurality of discovery signals. In some embodiments, the computer-readable medium further comprises code for causing the wireless communication device to transmit a channel reservation signal in the first subset of the plurality of expected beam transmission directions before transmitting the subset of the plurality of discovery signals based on the monitoring in first subset of the plurality of expected beam transmission directions. In some embodiments, the computer-readable medium further comprises code for causing the wireless communication device to transmit a channel reservation signal concurrent with one of the subset of the plurality of discovery signals based on frequency-division multiplexing (FDM). In some embodiments, wherein the code for causing the wireless communication device to sense the channel is further configured to monitor the channel in a second subset of the plurality of expected beam transmission directions within the discovery period; and detect a transmission from another wireless communication device over the channel in the second subset of the plurality of expected beam transmission directions, and wherein the computer-readable medium further comprises code for causing the wireless communication device to refrain from transmitting discovery signals in the second subset of the plurality of expected beam transmission directions based on the detecting. In some embodiments, the computer-readable medium further comprises code for causing the wireless communication device to transmit a data signal by multiplexing the data signal with one or more of the subset of the plurality of discovery signals in at least one of a frequency domain or a time domain. In some embodiments, wherein the data signal is transmitted in at least one of the first subset of the plurality of expected beam transmission directions. In some embodiments, wherein each of the plurality of discovery signals includes at least one of a primary synchronization signal (PSS), a secondary synchronization signal (SSS), a physical broadcast channel (PBCH) signal, or a discovery reference signal.

Further embodiments of the present disclosure include an apparatus comprising means for sensing a channel in a spatial domain based on a plurality of expected beam transmission directions, wherein the apparatus is associated with a first network operating entity, and wherein the channel is shared by a plurality of network operating entities including the first network operating entity; and means for transmitting a plurality of discovery signals in one or more of the plurality of expected beam transmission directions during a discovery period to facilitate synchronization in the channel based on the sensing.

In some embodiments, wherein the means for sensing is further configured to monitor the channel for a transmission from another wireless communication device using an omnidirectional reception beam before the discovery period. In some embodiments, the apparatus further comprises means for transmitting a channel reservation signal using an omnidirectional transmission beam before the discovery period based on the sensing. In some embodiments, wherein the means for sensing is further configured to monitor the channel in a first subset of the plurality of expected beam transmission directions for a transmission from another wireless communication device. In some embodiments, wherein the means for sensing is further configured to monitor the channel by configuring antenna elements of the wireless communication device to direct reception in a beam direction including a coverage over the first subset of the plurality of expected beam transmission directions. In some embodiments, wherein the means for transmitting the plurality of discovery signals is further configured to transmit, a subset of the plurality of discovery signals, each in one of the first subset of the plurality of expected beam transmission directions. In some embodiments, wherein the means for sensing is further configured to monitor the channel in a second subset of the plurality of expected beam transmission directions for a transmission from another wireless communication device, wherein the first subset and the second subset of the plurality of expected beam transmission directions are different, and wherein the channel is monitored in the first subset of the plurality of expected beam transmission directions and in the second subset of the plurality of expected beam transmission directions before the discovery period. In some embodiments, the apparatus further comprises means for transmitting a first channel reservation signal in the first subset of the plurality of expected beam transmission directions based on the monitoring in the first subset of the plurality of expected beam transmission directions; and means for transmitting a second channel reservation signal in the second subset of the plurality of expected beam transmission directions based on the monitoring in the second subset of the plurality of expected beam transmission directions. In some embodiments, wherein the channel is monitored in the first subset of the plurality of expected beam transmission directions within the discovery period before transmitting the subset of the plurality of discovery signals. In some embodiments, the apparatus further comprises means for transmitting a channel reservation signal in the first subset of the plurality of expected beam transmission directions before transmitting the subset of the plurality of discovery signals based on the monitoring in first subset of the plurality of expected beam transmission directions. In some embodiments, the apparatus further comprises means for transmitting a channel reservation signal concurrent with one of the subset of the plurality of discovery signals based on frequency-division multiplexing (FDM). In some embodiments, wherein the means for sensing is further configured to monitor the channel in a second subset of the plurality of expected beam transmission directions within the discovery period; and detect a transmission from another wireless communication device over the channel in the second subset of the plurality of expected beam transmission directions, and wherein the apparatus further comprises means for refraining from transmitting discovery signals in the second subset of the plurality of expected beam transmission directions based on the detecting. In some embodiments, the apparatus further comprises means for transmitting a data signal by multiplexing the data signal with one or more of the subset of the plurality of discovery signals in at least one of a frequency domain or a time domain. In some embodiments, wherein the data signal is transmitted in at least one of the first subset of the plurality of expected beam transmission directions. In some embodiments, wherein each of the plurality of discovery signals includes at least one of a primary synchronization signal (PSS), a secondary synchronization signal (SSS), a physical broadcast channel (PBCH) signal, or a discovery reference signal.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    sensing, by a wireless communication device, a channel in a spatial domain based on a plurality of expected beam transmission directions, wherein the wireless communication device is associated with a first network operating entity, and wherein the channel is shared by a plurality of network operating entities including the first network operating entity;
    transmitting, after the sensing, by the wireless communication device, a spatial-specific channel reservation signal in one or more of the plurality of expected beam transmission directions based on the sensing, wherein the transmitting the spatial-specific channel reservation signal comprises:
        transmitting, by the wireless commnication device, a first spatial-specific channel reservation signal in a first subset of the plurality of expected beam transmission directions; and
        transmitting, by the wireless communication device, a second spatial-specific channel reservation signal in a second subset of the plurality of expected beam transmission directions; and
    transmitting, after the sensing, by the wireless communication device, a plurality of discovery signals in the one or more of the plurality of expected beam transmission directions during a discovery period to facilitate synchronization in the channel based on the sensing.

2. The method of claim 1, wherein the sensing includes monitoring the channel for a transmission from another wireless communication device using an omnidirectional reception beam before the discovery period.

3. The method of claim 1, wherein the sensing includes monitoring the channel in the first subset of the plurality of expected beam transmission directions for a transmission from another wireless communication device.

4. The method of claim 3, wherein the transmitting includes transmitting, a subset of the plurality of discovery signals, each in one of the first subset of the plurality of expected beam transmission directions.

5. The method of claim 4, wherein the sensing further includes monitoring the channel in the second subset of the plurality of expected beam transmission directions for a transmission from another wireless communication device, wherein the first subset and the second subset of the plurality of expected beam transmission directions are different, and wherein the channel is monitored in the first subset of the plurality of expected beam transmission directions and in the second subset of the plurality of expected beam transmission directions before the discovery period.

6. The method of claim 5, wherein transmitting the spatial-specific channel reservation signal in the one or more of the plurality of expected beam transmission directions comprises:
transmitting, by the wireless communication device, the first spatial-specific channel reservation signal based on the monitoring in the first subset of the plurality of expected beam transmission directions; and
transmitting, by the wireless communication device, the second spatial-specific channel reservation signal based on the monitoring in the second subset of the plurality of expected beam transmission directions.

7. The method of claim 5, wherein the channel is monitored in the first subset of the plurality of expected beam transmission directions within the discovery period before transmitting the subset of the plurality of discovery signals.

8. The method of claim 7, wherein transmitting the spatial-specific channel reservation signal in the one or more of the plurality of expected beam transmission directions comprises:
transmitting, by the wireless communication device, the spatial-specific channel reservation signal in the first subset of the plurality of expected beam transmission directions during at least one of:
a time period before transmitting the subset of the plurality of discovery signals based on the monitoring in the first subset of the plurality of expected beam transmission directions; or
a time period concurrent with one of the subset of the plurality of discovery signals based on frequency-division multiplexing (FDM).

9. The method of claim 7, wherein the sensing includes:
monitoring the channel in a second subset of the plurality of expected beam transmission directions within the discovery period; and
detecting a transmission from another wireless communication device over the channel in the second subset of the plurality of expected beam transmission directions, and
wherein the method further comprises refraining, by the wireless communication device, from transmitting discovery signals in the second subset of the plurality of expected beam transmission directions based on the detecting.

10. The method of claim 4, further comprising transmitting a data signal by multiplexing the data signal with one or more of the subset of the plurality of discovery signals in at least one of a frequency domain or a time domain, wherein the data signal is transmitted in at least one of the first subset of the plurality of expected beam transmission directions.

11. The method of claim 1, wherein each of the plurality of discovery signals includes at least one of a primary synchronization signal (PSS), a secondary synchronization signal (SSS), a physical broadcast channel (PBCH) signal, or a discovery reference signal.

12. An apparatus comprising:
a processor configured to sense a channel in a spatial domain based on a plurality of expected beam transmission directions, wherein the apparatus is associated with a first network operating entity, and wherein the channel is shared by a plurality of network operating entities including the first network operating entity;
a transceiver configured to:
transmit, after the sensing, a spatial-specific channel reservation signal in one or more of the plurality of expected beam transmission directions based on the sensing by:
transmitting a first spatial-specific channel reservation signal in a first subset of the plurality of expected beam tranmsission directions; and
transmitting a second spatial-specific channel reservation signal in a second subset of the plurality of expected beam transmission directions; and
transmit a plurality of discovery signals in the one or more of the plurality of expected beam transmission directions during a discovery period to facilitate synchronization in the channel based on the sensing.

13. The apparatus of claim 12, wherein the processor is further configured to sense the channel by monitoring the channel for a transmission from another wireless communication device using an omnidirectional reception beam before the discovery period.

14. The apparatus of claim 12, wherein the processor is further configured to sense the channel by monitoring the channel in the first subset of the plurality of expected beam transmission directions for a transmission from another wireless communication device.

15. The apparatus of claim 14, wherein the transceiver is further configured to transmit the plurality of discovery signals by transmitting a subset of the plurality of discovery signals, each in one of the first subset of the plurality of expected beam transmission directions.

16. The apparatus of claim 15, wherein the processor is further configured to sense the channel by monitoring the channel in the second subset of the plurality of expected beam transmission directions for a transmission from another wireless communication device, wherein the first subset and the second subset of the plurality of expected beam transmission directions are different, and wherein the channel is monitored in the first subset of the plurality of expected beam transmission directions and in the second subset of the plurality of expected beam transmission directions before the discovery period.

17. The apparatus of claim 16, wherein the transceiver configured to transmit the spatial-specific channel reservation signal comprises the transceiver configured to:
transmit the first spatial-specific channel reservation signal based on the monitoring in the first subset of the plurality of expected beam transmission directions; and
transmit the second spatial-specific channel reservation signal based on the monitoring in the second subset of the plurality of expected beam transmission directions.

18. The apparatus of claim 16, wherein the channel is monitored in the first subset of the plurality of expected beam transmission directions within the discovery period before transmitting the subset of the plurality of discovery signals.

19. The apparatus of claim 18, wherein the transceiver configured to transmit the spatial-specific channel reservation signal comprises the transceiver configured to:
transmit the spatial-specific channel reservation signal in the first subset of the plurality of expected beam transmission directions during at least one of:
a time period before transmitting the subset of the plurality of discovery signals based on the monitoring in the first subset of the plurality of expected beam transmission directions; or
a time period concurrent with one of the subset of the plurality of discovery signals based on frequency-division multiplexing (FDM).

20. The apparatus of claim 18, wherein the processor is further configured to:
sense the channel by:

monitoring the channel in the second subset of the plurality of expected beam transmission directions within the discovery period; and detecting a transmission from another wireless communication device over the channel in the second subset of the plurality of expected beam transmission directions; and refrain from transmitting discovery signals in the second subset of the plurality of expected beam transmission directions based on the detecting.

21. The apparatus of claim 15, wherein the transceiver is further configured to transmit a data signal by multiplexing the data signal with one or more of the subset of the plurality of discovery signals in at least one of a frequency domain or a time domain, wherein the data signal is transmitted in at least one of the first subset of the plurality of expected beam transmission directions.

22. The apparatus of claim 12, wherein each of the plurality of discovery signals includes at least one of a primary synchronization signal (PSS), a secondary synchronization signal (SSS), a physical broadcast channel (PBCH) signal, or a discovery reference signal.

23. A non-transitory computer-readable medium having program code recorded thereon, the program code comprising:

code for causing a wireless communication device to sense a channel in a spatial domain based on a plurality of expected beam transmission directions, wherein the wireless communication device is associated with a first network operating entity, and wherein the channel is shared by a plurality of network operating entities including the first network operating entity;

code for causing the wireless communication device to transmit, after the sensing, a spatial-specific channel reservation signal in one or more of the plurality of expected beam transmission directions based on the sensing, the code for causing the wireless communication device to transmit the spatial-specific channel reservation signal is configured to cause the wireless communication device to:

transmit a first spatial-specific channel reservation signal in a first subset of the plurality of expected beam transmission directions; and transmit a second spatial-specific channel reservation signal in a second subset of the plurality of expected beam transmission directions; and code for causing the wireless communication device to transmit, after the sensing, a plurality of discovery signals in the one or more of the plurality of expected beam transmission directions during a discovery period to facilitate synchronization in the channel based on the sensing.

24. The non-transitory computer-readable medium of claim 23, wherein the code for causing the wireless communication device to sense the channel is further configured to monitor the channel for a transmission from another wireless communication device using an omnidirectional reception beam before the discovery period.

25. The non-transitory computer-readable medium of claim 23, wherein the code for causing the wireless communication device to sense the channel is further configured to monitor the channel in the first subset of the plurality of expected beam transmission directions for a transmission from another wireless communication device.

26. The non-transitory computer-readable medium of claim 25, wherein the code for causing the wireless communication device to transmit the plurality of discovery signals is configured to cause the wireless communication device to transmit, a subset of the plurality of discovery signals, each in one of the first subset of the plurality of expected beam transmission directions.

27. The non-transitory computer-readable medium of claim 26, wherein the channel is monitored in the first subset of the plurality of expected beam transmission directions within the discovery period before transmitting the subset of the plurality of discovery signals.

28. The non-transitory computer-readable medium of claim 27, wherein the code for causing the wireless communication device to sense the channel is further configured to:

monitor the channel in the second subset of the plurality of expected beam transmission directions within the discovery period; and detect a transmission from another wireless communication device over the channel in the second subset of the plurality of expected beam transmission directions, and wherein non-transitory the computer-readable medium further comprises code for causing the wireless communication device to refrain from transmitting discovery signals in the second subset of the plurality of expected beam transmission directions based on the detecting.

* * * * *